Jan. 16, 1962     K. MACLEOD     3,017,203
CONNECTORS FOR PLASTIC HOSE
Filed July 19, 1957     6 Sheets-Sheet 1
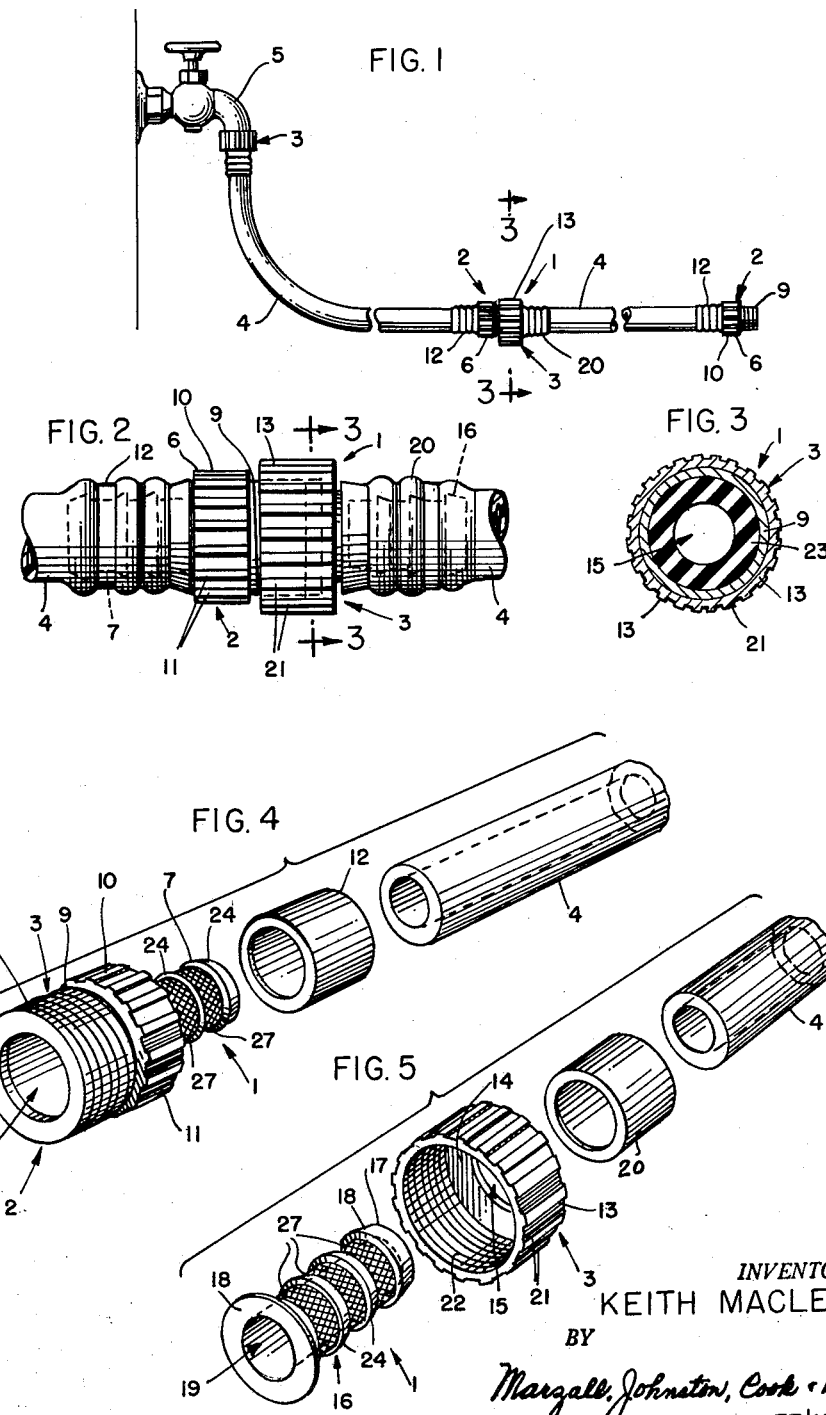
INVENTOR:
KEITH MACLEOD
BY
Marshall, Johnston, Cook & Root
ATT'YS Jan. 16, 1962 K. MACLEOD 3,017,203
CONNECTORS FOR PLASTIC HOSE
Filed July 19, 1957 6 Sheets-Sheet 2
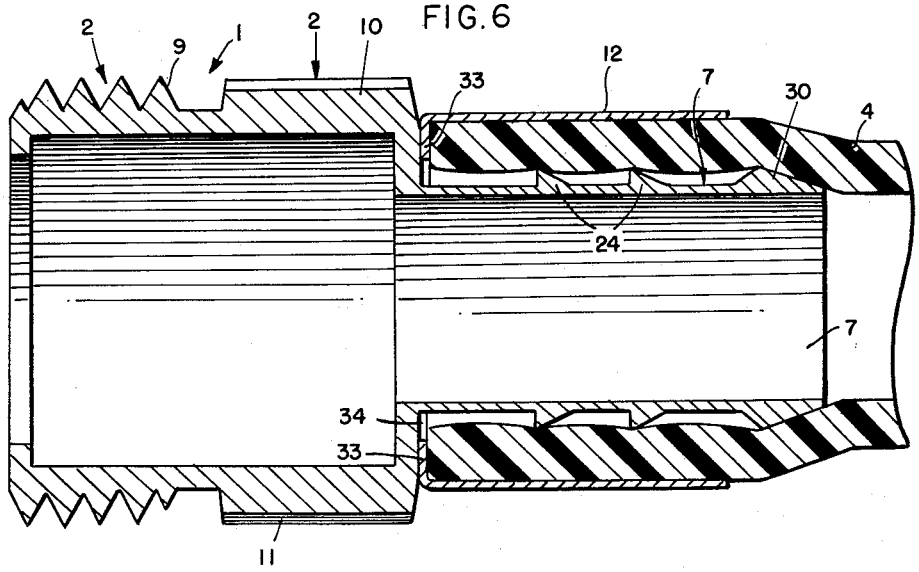
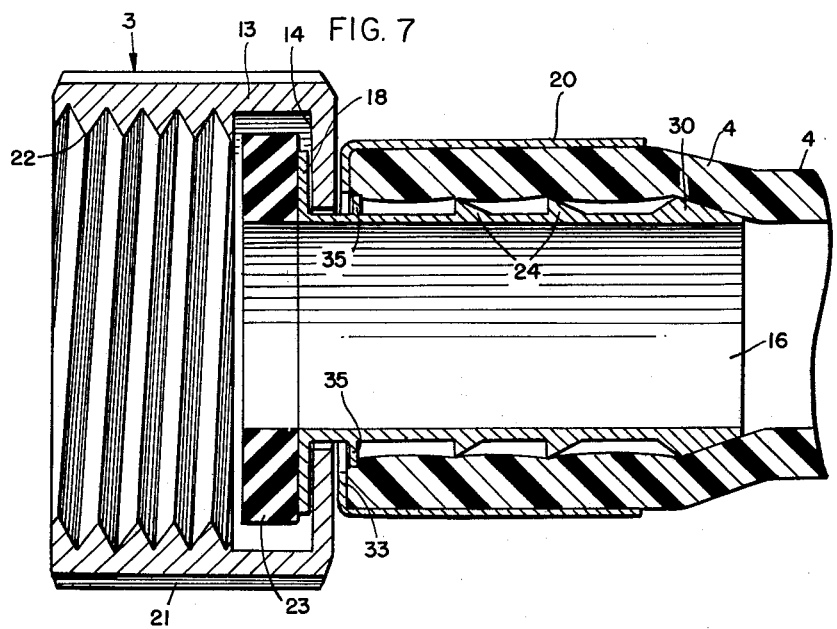
INVENTOR:
KEITH MACLEOD Jan. 16, 1962 K. MACLEOD 3,017,203
CONNECTORS FOR PLASTIC HOSE
Filed July 19, 1957 6 Sheets-Sheet 3
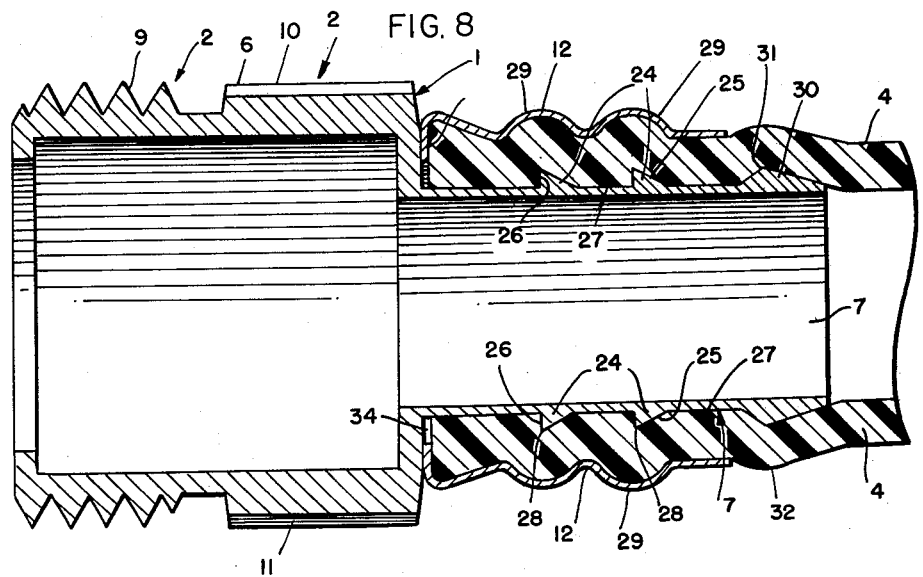
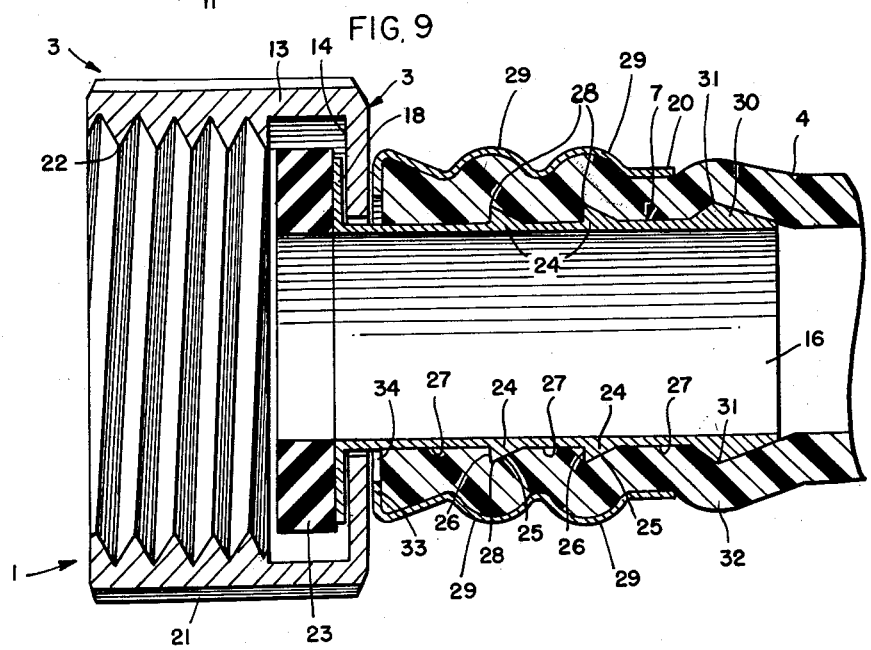
INVENTOR:
KEITH MACLEOD
BY
Marzall, Johnston, Cook & Root
ATT'YS Jan. 16, 1962   K. MACLEOD   3,017,203
CONNECTORS FOR PLASTIC HOSE
Filed July 19, 1957   6 Sheets-Sheet 4

INVENTOR:
KEITH MACLEOD
BY
ATT'YS

Jan. 16, 1962  K. MACLEOD  3,017,203
CONNECTORS FOR PLASTIC HOSE
Filed July 19, 1957  6 Sheets-Sheet 5
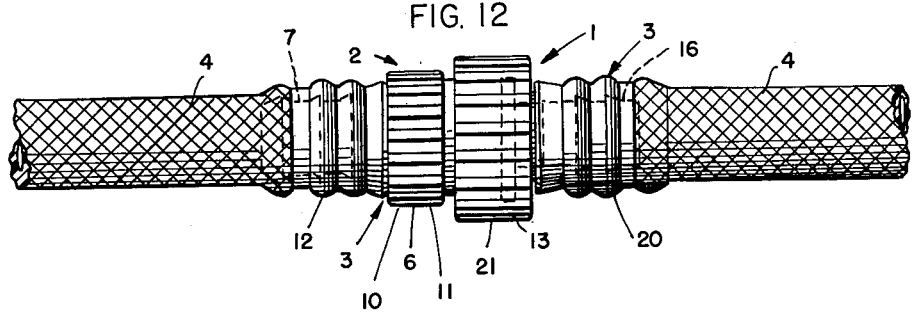
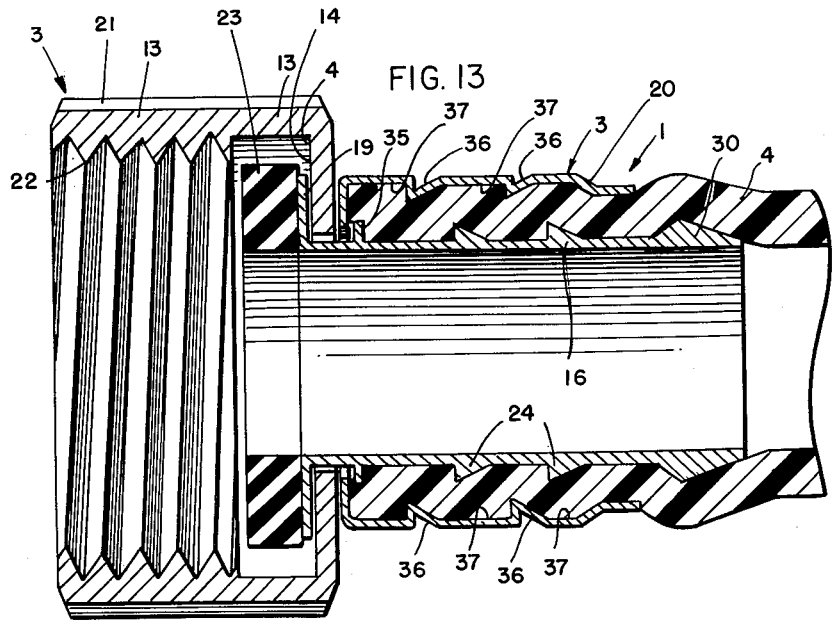
INVENTOR:
KEITH MACLEOD
BY
Margall, Johnston, Cook & Root.
ATT'YS

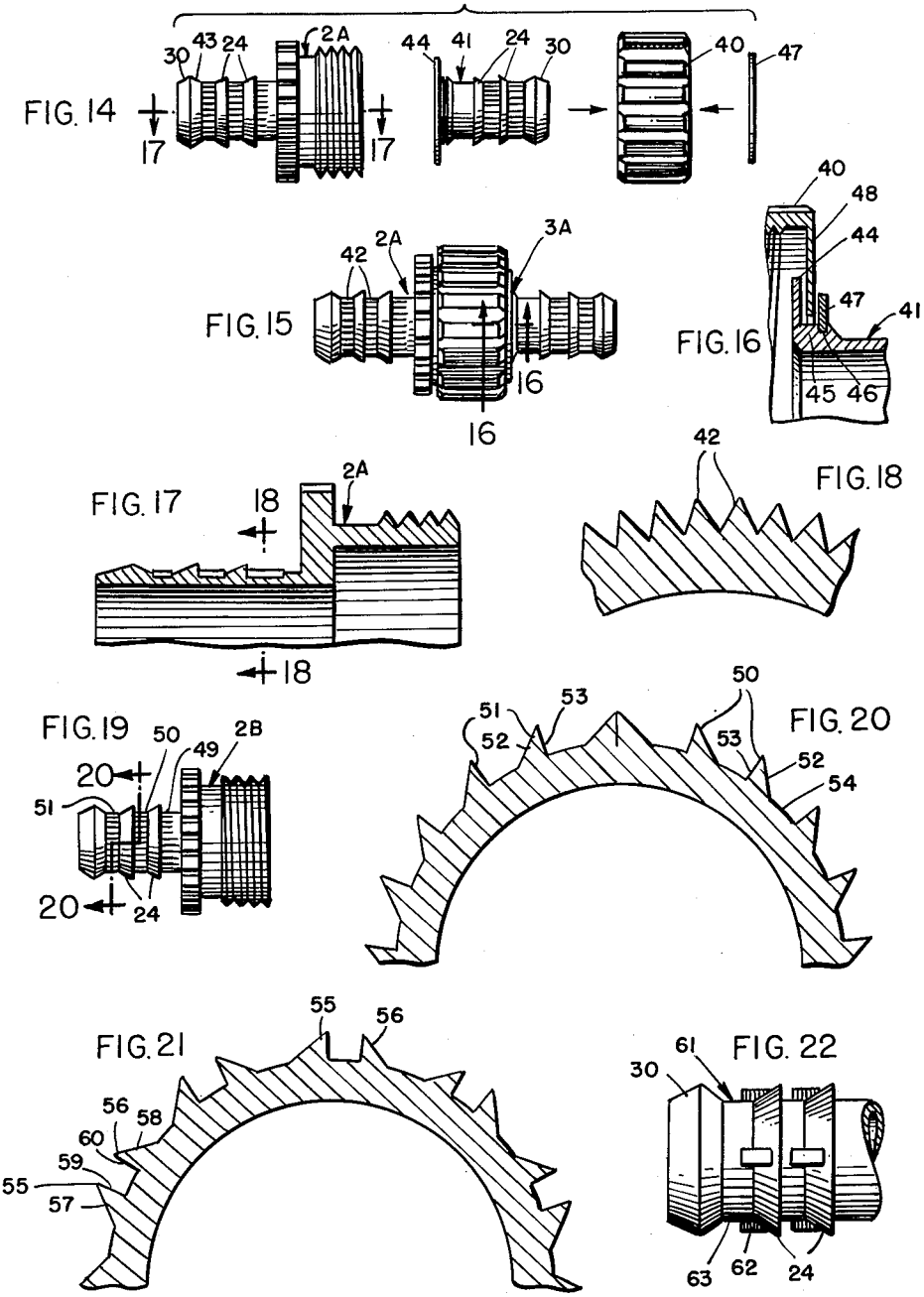

United States Patent Office 3,017,203
Patented Jan. 16, 1962

3,017,203
CONNECTORS FOR PLASTIC HOSE
Keith Macleod, Santa Barbara, Calif., assignor to W. D. Allen Manufacturing Co., Chicago, Ill., a corporation of Illinois
Filed July 19, 1957, Ser. No. 673,094
2 Claims. (Cl. 285—256)

This application is a continuation-in-part of applicant's copending application, Serial No. 616,547, filed October 17, 1956, for Connectors for Plastic Hose, and now abandoned.

This invention relates to connectors or couplings for use in interconnecting lengths of flexible hose or for connecting flexible hose to a water outlet or for connecting spraying accessories to flexible hose, and more particularly to improved connectors and couplings especially useful on plastic hose. Preferably, the plastic hose is of a synthetic resinous type, such as polyvinyl chloride or the like.

This invention consists generally of a new and improved connector or coupling which may be applied to the end of a plastic garden hose and which has proven superior to hose connectors heretofore used with garden hoses. Heretofore, garden hoses have been manufactured of rubber or rubberized material and have been provided with connective fittings which may include a tail or stem member for insertion into the end of the hose and a ferrule for clamping over the end of the hose and securing the hose tightly around the stem member. More recently, plastic hoses have been developed and have been accepted generally by the public. It has been found that connective fittings or couplings which have proven satisfactory with rubber hoses have failed to perform satisfactorily when applied to plastic hoses; and that with continued use, a plastic hose commonly fails at the end juncture where the plastic hose is secured to the metallic fitting. Such failure has been found due to the inherent properties of plastic, one of which being that the plastic is subject to "cold flow." When such a hose is placed under continual pressure or tension, the plastic material tends to "flow" from the confines between the stem member and the ferrule such that the coupling loosens from the hose. Such "flow" of the material is accentuated by heat, but will nevertheless continue at normal temperatures.

An object of this invention is to provide an improved connector particularly adapted for use with hoses of plastic material which is subject to "cold flow," the connector including a novel tail member for insertion into an end of a plastic hose, there being sharp circumferential ridges formed around the tail member to provide sharp edges for gripping the plastic material.

A further object of this invention is to provide a connector with a stem member having sharp circumferential ridges of triangular cross section, the ridges being separated from each other by a generally cylindrical surface, the end of the hose being stretched over the stem member and clamped thereon by a ferrule having inwardly projecting corrugations, the corrugations of the ferrule extending circumferentially around the hose and positioned in opposed spaced relation to the cylindrical surface between the ridges, the hose being prevented from twisting or rotating upon the stem member by providing longitudinal projections upon the cylindrical surface.

Another object of this invention is to provide an improved hose connector wherein a stem member has an inside diameter substantially equal to the inside diameter of the hose such that the hose must be stretched circumferentially over the stem member and providing further a ferrule for clamping upon and indenting the hose between circumferential ridges on the stem member; the stem member and the ferrule may have cooperating parts such that the ferrule will directly engage the circumferential flange of the stem member for strengthening the connection and preventing the hose and ferrule from separating from the stem member under conditions of prolonged tension.

A further object of this invention resides in the provision of a coupling for plastic hose including a tail member having externally formed circumferential razor-sharp projections axially spaced therealong, whereby the projections are arranged to oppose removal of the hose from the coupling.

A still further object of this invention is in the provision of a coupling for plastic hose including a tail piece having externally formed circumferential razor-sharp projections axially spaced therealong to oppose relative axial movement between the hose and coupling, and axially extending projections between the circumferential projections for resisting relative axial movement between the hose and coupling.

Another object of this invention is to provide a method of assembling the parts of the female section of a coupling.

Still another object of this invention is to make the coupling or connector of molded nylon or powdered metal.

A more complete understanding of the present invention, its mode of operation and its advantages, may be gathered from further reading of this specification, together with an inspection of the accompanying drawings in which:

FIG. 1 is an elevational view of two lengths of hose with fittings according to the teachings of this invention; the length being attached to a sill cock and to each other in a manner in which they may be used;

FIG. 2 is an elevational view of the junction between the two lengths of hoses, each length having a connector according to the teachings of this invention;

FIG. 3 is a cross-section along the lines 3—3 of FIGS. 1 and 2;

FIG. 4 is an exploded view of the male connector as it may be assembled, the various parts of the hose and the connector being shown in perspective;

FIG. 5 is an exploded view of a female connector as it is about to be assembled, the hose part and connector parts being shown in perspective;

FIG. 6 is a longitudinal cross-section of the male connector of this invention in the process of assembly on the end of a hose, the end of the hose being placed over the stem of the connector with a ferrule therearound prior to the clamping upon the hose material;

FIG. 7 is a view similar to FIG. 6, except that the hose is applied over the stem part of a female connector;

FIG. 8 is a longitudinal sectional view of a male connector similar to FIG. 6, but having the ferrule crimped inwardly upon the end of the hose over the stem;

FIG. 9 is a longitudinal sectional view of the female connector similar to FIG. 7, but illustrating the ferrule crimped inwardly upon the end of the hose;

FIG. 12 is an elevational view of hoses joined by a pair of connectors of this invention, the hoses being formed of a plastic impregnated material;

FIG. 13 illustrates another embodiment of this invention wherein the ferrule member is formed with inwardly projecting circumferential indentations of substantially triangular cross-section and wherein an end part of the ferrule is inserted over an outwardly extending collar of the stem member and is crimped inwardly behind the collar for increasing the tensile strength of the connector;

FIG. 14 is an exploded elevational view of a modified coupling according to the invention wherein the female connector has its nut swively mounted on the tail piece;

FIG. 15 is an assembled elevational view of the coupling of FIG. 14;

FIG. 16 is an enlarged fragmentary sectional view taken substantially along line 16—16 of FIG. 15;

FIG. 17 is an enlarged fragmentary sectional view taken substantially along line 17—17 of FIG. 14;

FIG. 18 is a greatly enlarged sectional view taken substantially along line 18—18 of FIG. 17;

FIG. 19 is a side elevational view of a male connector having a modified form of projections extending longitudinally thereof;

FIG. 20 is an enlarged fragmentary sectional view taken substantially along line 20—20 of FIG. 19;

FIG. 21 is a view similar to FIG. 20 but showing another modified form of longitudinal projections; and FIG. 22 is an enlarged fragmentary side elevational view of a tail piece having still another modified form of longitudinally extending projections thereon.

Figure 10:
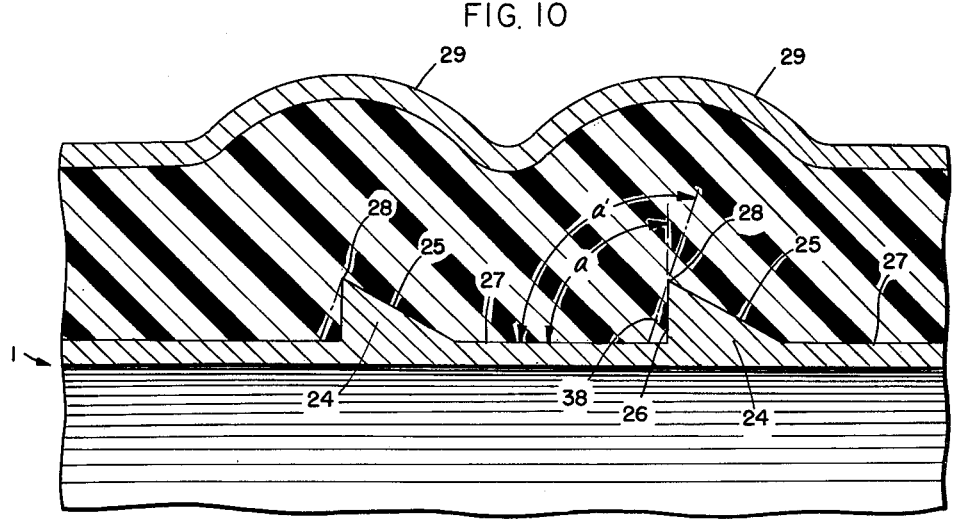
FIG. 10 is an enlarged longitudinal sectional view of a part of the connector of this invention and illustrating particularly the stem or tail, the hose material, and the crimped ferrule.

The hose connection of the invention comprises a connector or coupling 1, which may either be a male connector 2 or a female connector 3, applied to a hose 4. As an example of use, a female connector 3 may be secured at one end of the hose for attachment to a water supply, such as a sill cock 5 while the other end of the hose may be connected to a water sprinkler or like type of accessory (not shown). Also, lengths of hose may be connected together by the interengagement of a male connector 2 with a female connector 3, as shown in FIG. 2. The invention contemplates the use of a connector 1 on each end of a length of hose, whether the connector comprises a male connector 2, or a female connector 3.

FIGS. 4 and 5 disclose exploded views of the male connector 2 and a female connector 3, respectively. The male connector 2, more clearly shown in FIG. 4, comprises a hollow body 6 to which a tail 7, in the nature of an elongated tube, is formed, preferably integral with the body 6. The tail 7 is hollow, having an elongated opening therethrough which cooperates with the opening 8 extending through the opposite end of the body 6. The outer end of the body 6 is provided with external threads 9 which are adapted to cooperate with internal threads of a cooperating coupling or connecting female member or connector. Intermediate the outer end of the body 6 and the inner end of the tail 7 there is provided an enlargement 10 which is grooved, as indicated at 11, in the form of ribs and grooves to permit the member to be grasped easily. A ferrule 12 is adapted to encircle an end of the hose 4 over the end of the hose surrounding the tail member 7.

FIG. 5 discloses the female connector or member, which comprises a cup-shaped body member or nut 13 having one end open and its other end flanged, as indicated at 14. The flanged end 14 is provided with a circular opening 15 therein. A hollow female tail member 16 is adapted to cooperate with the nut 13 by inserting the front end 17 thereof through the central opening 15 in the nut 13. The opposite end of the tail 16 is provided with an annular flange 18, the inner surface of which is adapted to abut and engage against the flange 14 of the nut 13. The tail 16, like the tail 7 is adapted to have an elongated opening 19 extending longitudinally throughout for connection to a hose 4.

The female tail 16 is adapted to be inserted in the end of the hose 4, and a ferrule 20, like the ferrule 12, is adapted to encircle the end of the hose over the female tail piece 16. The male tail 7 is also adapted to be inserted in the end of a hose 4, and the ferrules 12 and 20 are applied about the hose over their respective tails 7 and 16.

The nut 13 of the female member 3, FIG. 5, is adapted to be grooved, as indicated at 21, which is specifically shown as constituting spaced ribs and grooves. The nut 13 of the female member 3 is swively or rotatively connected with respect to its cooperating female tail 16, so that it may be connected to a threaded male member, such as the male member 2, FIG. 2. The grooving 21 permits easy grasping, and permits manual rotative manipulation of the nut 13. The nut 13 of the female member 3 is adapted to be internally threaded, as indicated at 22, for cooperation with external threads on the threaded portion of the male connector. A flexible washer member 23, FIG. 3, is adapted to be inserted within the nut 13 inwardly against the flange 19 on the female tail 16, so that when the female connector 3 is connected to a male connector, a tight waterproof joint will be provided between the nut 13 and its cooperating tail 16. The tightening of the female member 3 unto a male member will cause the flange 18 on the female tail 16 to be tightly clamped against the inside flange 14 of the nut 13, and thus prevent water from leaking between the female member 3 and its female ferrule 16.

FIGS. 8 and 9 illustrate a preferred embodiment of this invention as it may be applied to the male connector or coupling 2, FIG. 8, or to the female connector or coupling 3, FIG. 9. Each of the connectors 2 and 3, shown in FIGS. 8 and 9 includes the hollow tail member 7 or 16 which is inserted into an end of the plastic hose 4. A ferrule 12 or 20 encircles the end of the hose 4 over its respective tail member and is clamped tightly thereon to exclude all air bubbles, such that the space between a tail member 7 or 16 and the respective ferrules 12 or 20 is filled with plastic hose material only.

Each of the tail members 7 and 16 is formed with a plurality of razor sharp circumferential ridges or projections 24, each ridge 24 being formed with a conical surface of shallow or gentle slope and with another surface which may be a plane having an abrupt slope. For purposes of this specification, the tail members and their respective ferrules will be regarded as having forward and rearward ends, the forward part being at the end of the hose 4, the tail members 7 and 16 and their ferrules 12 and 20 extending rearwardly with the hose.

Thus, each circumferential ridge or projection 24 of each tail member will have a rearward side 25 remote from the end of the hose 4 which has a shallow slope and a forward side 26 facing the end of the hose and having an abrupt or substantially right angle slope.

Between each adjacent pair of circumferential ridges 24 of each tail member 7 and 16, the body is formed with a generally cylindrical surface 27. As shown in FIGS. 4 and 5, the cylindrical surfaces 27 between the adjacent pairs of circumferential ridges 24 may be knurled or roughened somewhat. The knurled surfaces of the cylindrical surfaces 15 grip the plastic hose material and prevent the hose 4 from being rotated axially upon tail members 7 and 16.

An important feature of the invention lies in the shaping of the circumferential ridges 24 of the tail members in that the forward and rearward surfaces thereof meet to form a razor-sharp edge 28. When the plastc hose material is pressed around a tail member, all air pockets therein are excluded, and it has been found that there is little or no tendency for the plastic material to "cold flow" around the sharp edges 28. Thus, the sharp edges 28 constitute a means for gripping the plastic and preventing the "cold flow" of that material. Sliding of a razor-sharp projection against plastic hose in a slicing manner will easily cut the hose and therefore it is important to prevent axial rotation of the hose on the coupling. The knurled or roughened cylindrical surface 27 between the ridges 24 thus prevents the end of the plastic hose from twisting or rotating on the tail or stem, and thereby prevents the sharp edges 28 from cutting the plastic. Accordingly, the sharp edges 28 and the knurled surfaces 27 cooperate to grip the plastic material therearound—the sharp edges 28 preventing the material from moving longitudinally of a tail or stem, and the knurled surfaces 27 preventing the plastic hose material from rotating about the tail or stem.

The couplings and associated parts are preferably made of brass, and in order to obtain the razor-sharp ridges or projections, it is necessary to machine the tail pieces. No other method of manufacture of brass coupling can give such razor-sharp projections, which are necessary to give the desired result of the invention. Without the razor-sharp projections, plastic hose will not be held on the couplings as effectively, and the only way to obtain the razor-sharp projections is by a machining operation.

A preferred embodiment of this invention is shown in FIGS. 8 and 9, wherein the ferrules 12 and 20 are crimped or pressed against the end of the plastic hose 4 and over the tails or stems excluding the air therefrom. The crimping process forms arcuate circumferential corrugations 29 encircling the hose and the tail or stem. The corrugations 29 are arranged such that the maximum diameter thereof is positioned around each of the ridges 24 of a tail member, and the minimum diameters of the corrugations are positioned around and spaced oppositely to the knurled cylindrical surface 27 which constitutes a trough portion between each adjacent pair of ridges. By arranging the corrugations in such a manner, it may be seen that the wall thickness of the plastic hose about tail members 7 and 16, and within their respective ferrules 12 and 20, is maintained substantially constant. Thus, there are no inherent weak sections developed which could result if a minimum diameter of the ferrule corrugations appeared in spaced opposition to the circumferential ridges.

The cylindrical sections 27 arranged between the circumferential projections 24 facilitate making room in which to pack and compact the plastic hose after crimping the ferrule thereon which could not be as effectively accomplished if the surfaces were sloping. Also, the compacting of the plastic hose directly against the projections is more easily accomplished by the presence of the cylindrical sections to thereby further prevent the plastic from flowing over the projections.

To provide a hose fitting which will pass water freely, the inside diameter of a tail member 7 or 16 is dimensioned substantially equal to the normal inside diameter of the plastic hose 4. Thus, the end of the hose 4 must be stretched when a tail member is inserted therein and the resultant hose fitting contains no narrow diameter passages which would restrict the flow of liquid.

An important feature in maintaining the inner flow passageway of the hose and its fitting or connector at a predetermined diameter is the use of a circumferential end ridge 30 positioned near the end of a tail member and beyond the confining limits of a ferrule, FIGS. 8 and 9. The circumferential ridge 30 may be formed with conical sides having opposite slope which may intersect at an edge 31. The circumferential end ridge 30 causes the plastic hose 4 to bulge outwardly in the form of a circumferential ring or bulge 32. Since the end ridge 30 extends rearwardly of the confining limits of a ferrule 12 or 20, there will be no tendency for the plastic material of the hose 4 to be depressed or squeezed together to a narrow diameter when a ferrule is lockingly applied about a tail member by a spinning operation, or otherwise. Therefore, the end ridge 30, extending beyond the limits of a ferrule, constitutes a means for maintaining the hose passage unrestricted during, and after, the ferrule spinning and clamping operations.

The method of coupling or assembling the connectors or couplings of this invention to a plastic hose may be best understood with reference to FIGS. 6 and 7 taken in conjunction with FIGS. 8 and 9. A ferrule 12 or 20, in plain cylindrical form, is initially of somewhat larger diameter, FIGS. 6 and 7. The end of the hose 4 may be easily inserted into a ferrule and thence the hose 4, together with the ferrule, may be forced over a tail member 7 or 16. In applying the end of the hose 4 over a tail member, the hose may be stretched somewhat, as shown in FIGS. 6 and 7. In a subsequent spinning or crimping operation, the ferrule is clamped tightly over the hose so that the ferrule is ultimately shaped, as shown in FIGS. 8 and 9. If heat is applied to the plastic end of the hose, it may be softened, thereby, and more easily, to facilitate the spinning or crimping operation of the ferrule as well as the insertion of the tail piece within an end of a hose.

A ferrule 12 or 20, prior to crimping, is generally cylindrical in shape, as shown in FIGS. 4, 5, 6, and 7, but the ferrule is of metal sufficiently malleable to be deformed into corrugations about the hose by a spinning or crimping operation. The ferrule initially is provided with an inwardly turned flange 33 that provides an abutment against which the end of the hose may be pressed. When crimped, portions of the cylindrical surface of a ferrule will be formed into the reduced corrguated diameters and, likewise, the end flange 33 may be reduced in diameter such that the diameter of an opening 34 through the end flange 33 is likewise reduced.

A collar or outwardly extending shoulder flange 35, FIGS. 7 and 13, may be formed integrally with a tail member 7 or 16. The shoulder flange 35 is positioned near the end or extremity of the hose 4 after assembly and rearwardly of the inwardly extending flange 33 on the ferrule. The flange 35 is dimensioned to permit a ferrule 12 or 20, and the inward flange 33 to be inserted therearound during the assembly operation and before the spinning or other crimping operation of the ferrule. After the ferrule is crimped, and due to the malleability of the metal thereof, the opening 34 is reduced in diameter and the flange 33 will be locked over the flange 35, as shown in FIG. 13. Thus, after assembly, the opening 34 in the end flange 33 is reduced to a dimension less than the outside diameter of the flange 35 and the ferrule is secured directly to the tail member. This feature adds tensile strength to the hose coupling since the ferrule member is locked to the tail or stem and actively assists in gripping the plastic hose material of the hose as does the tail member.

Figure 11:
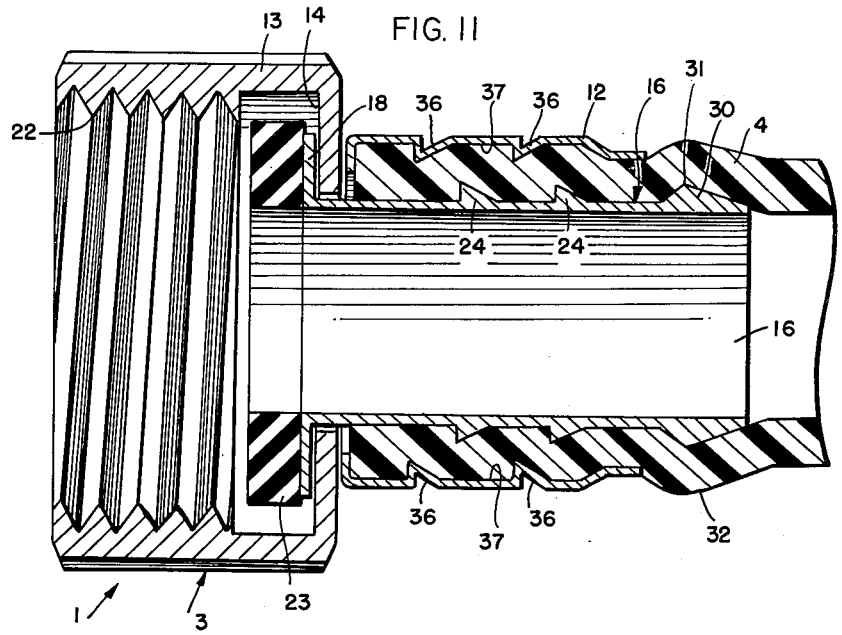
FIG. 11 illustrates another embodiment of this invention wherein the ferrule member is crimped with inwardly projecting circumferential indentations having substantially triangular cross-sections and sharp edges.

A further embodiment of this invention is illustrated in FIGS. 11 and 13 where a ferrule member is formed with inwardly extending ridges or indentations 36 of a shape similar to the ridges 24 of a tail member 7 or 16. Thus, the indentations 36 may have a conical surface of shallow slope forming a rearward side thereof, and a plane surface of abrupt slope forming a forward side. As in the case of the ridges 24 of the tail member, the indentations 36 likewise have razor-sharp edges defined by the forward and rearward surfaces thereof, which sharp edges grip the plastic material of the hose and prevent "cold flow" thereof in the same manner as previously described in connection with the ridges 24. Each adjacent pair of indentations 36 is separated by a cylindrical surface 37 in a manner similar to the cylindrical surfaces 27 between each adjacent pair of ridges 24.

FIG. 10 illustrates in detail the circumferential ridges 24 of a tail member 7 or 16. As depicted in solid lines, the circumferential ridge 24 includes the rearward side 25 having a shallow slope as compared with the cylindrical surface 27. The forward side 26 has an abrupt slope and intersects the rearward side 25 at a sharp edge 28. As shown in full lines in FIG. 10, the forward side 26 may be a plane which is perpendicular to the axis of the tail member and perpendicular to the cylindrical surface 27. Thus, the angle $a$, in a preferred embodiment, would be 90°. It has been found, however, that the forward side 26 may also be of conical shape and have a slope other than 90°, as illustrated by 38 in dashed lines. Thus, the angle $a'$ may be greater than 90°. Specifically, it has been found that the shape of the circumferential ridges 24 may include a forward side making an angle a—a' of 90°–100° with the axis of a tail member. Thus, the variance in the forward side may be as much as 10° of slope from the plane surface 26 and still be effectively operable to prevent "cold flow" of the plastic.

Another modified form of coupling or connector is shown in FIGS. 14 to 18 which differs in the manner in which the nut 40 is retained on the tail piece 41 of the female connector 3A, and in the formation of longitudinally extending projections 42 between the circumferential razor-sharp projections 24 of the female tail piece 41 and the male tail section 43.

As seen most clearly in FIG. 16, the forward end of the tail piece is provided with the usual outwardly extending radial flange 44 and a thickened annular portion 45. An external annular groove 46 is formed in the thickened annular portion 45 for receiving a locking ring or stop retaining ring 47 so as to define with the flange 44 on the tail piece an annular groove for swivelly receiving the flange 48 on the nut 40. The locking ring 47 also serves to prevent the flexible hose from being urged against the flange 48 of the nut 40 during assembly and thereby bind the nut against the flange 44 of the tail piece and inhibit free rotation of the nut on the tail piece after assembly. Thus, the hose is stopped by the ring 47 as it is inserted or as it is telescopically arranged over the end of the tail piece 41.

In assembling the tail piece, nut and locking ring, the tail piece 41 is inserted into the nut so that the flange 48 of the nut 40 engages the flange 44 of the tail piece. Then the locking ring 44 is arranged in alignment with the groove 46 and the end of the tail piece about the thickened portion 45 is expanded to lock the ring 47 in the groove 46. This expanding operation may be effected by any suitable type of expansion tool or any other method desired.

The longitudinally extending projections 42 arranged between the circumferential projections 24 are seen in FIG. 18 as being provided with relatively razor-sharp outer edges which more effectively prevent relative rotation between the tail pieces and the flexible plastic hose. Formation of the longitudinally extending projections may be accomplished by any known manufacturing method, for example, by longitudinal knurling which is effectively an upsetting operation. The ordinary commercial knurling is not nearly as effective as the longitudinal type of knurling or upsetting as shown in FIG. 18. Accordingly, this embodiment discloses circumferential and longitudinal razor-sharp projections serving to respectively prevent longitudinal and rotational relative movement between the tail pieces and the plastic hose.

An alternative form of longitudinally extending projections to be arranged between the circumferential projections is provided in the embodiment of FIGS. 19 and 20 on the male connector 2B. In this embodiment, three axially spaced rows of projections 49, 50 and 51 are provided and the projecticons are shaped similar to the circumferential projections 24 wherein each of the projections 49, 50 and 51 include a sloping side 52 and a substantially radially extending side 53, FIG. 20. The projections 49 and 51 have the radial sides 53 facing one direction while the projections 50 have their radial sides facing in another direction, thereby providing a series of projections which oppose rotational movement of the plastic hose in either direction. Between all of the projections are cylindrical sections 54 which allow the plastic hose to be compacted tightly downwardly against the outer surface of the tail pieces and tightly against the radial faces 53 of all the projections.

Another embodiment of the invention is shown in FIG. 21 wherein it differs only in the type of longitudinal projections provided for resisting rotational forces. In this arrangement, a plurality of sets of circumferentially spaced projections 55 and 56 are arranged around the tail piece between the circumferentially extending projections 24 so that they have remotely positioned sloping sides 57 and 58 respectively and adjacently located radial sides 59 and 60, wherein the projections 55 resist rotational movement between the tail piece and the plastic hose in one direction, while the projections 56 resist rotational movement between the tail piece and the plastic hose in the other direction.

Still another modification of the invention as disclosed in FIG. 22 wherein a tail piece 61 having the usual axially spaced circumferential razor-sharp projections 24 thereon is provided with a plurality of longitudinally extending and circumferentially spaced projections 62 which extend rearwardly from the circumferential projections 24 and terminate intermediate the cylindrical sections 63. These projections preferably have a height slightly less than the height of the circumferential projections 24 and are substantially rectangular in shape looking from the top wherein the long axis parallels the axis of the coupling tail piece. Preferably, the projections terminate in spaced relation from the adjacent circumferential projection or end portion 30 as seen in FIG. 22. Although the projections 62 are circumferentially spaced at 90° apart, it will be appreciated that they may be spaced closer or farther apart depending upon the size of the tail piece. Further, eight projections are normally provided on the female tail piece such as that shown in FIG. 22, while twelve projections may be provided on a male tail piece because the male tail piece is obviously under a greater stress during diassembly of the entire coupling. Although this form may be machined from brass, it is preferably molded from nylon or powdered metal or the like thereby permitting an inexpensive tail piece or coupling to be made.

The invention provides means for positively locking a coupling or connector to a plastic hose, so as to positively insure a tight joint, and prevent any leakage from occurring between the connector and the hose because of "cold flow" which occurs in any type of plastic hose. In actual practice it has been found that the use of the present connectors on hoses positively locks the hose to its respective connector. Actual swing tests have proven that the present invention is capable of withstanding more than six hundred consecutive swings without any leakage between the connector and the hose, where the same swing tests using conventional couplings or connectors applied to plastic hoses will leak after only one hundred such tests.

The connectors of the invention are relatively simple in construction, may be made more readily and more economically, and when applied to plastic hoses, insure continued long life without in any way damaging the hose and still maintaining tight connections between the hose and the connectors.

Changes may be made in the form, construction and arrangement of the parts without departing from the spirit of the invention or sacrificing any of its advantages, and the right is hereby reserved to make all such changes as fall fairly within the scope of the following claims.

The invention is claimed as follows:

1. A coupling for mechanically locking a hose of synthetic resinous plastic material thereto wherein said plastic material has inherent cold flow properties and said coupling prevents cold flow of the hose relative thereto when the coupling is completely assembled on the hose, said coupling comprising a connector member, a hollow tail member extending from said connector member and inserted into an end of the hose, and a ferrule encircling the end of the hose and clamping same on the tail member, said tail member having an inside diameter substantially equal to the normal inside diameter of the hose whereupon the end of the hose must be stretched to an increased diameter for insertion of the tail member therein, said tail member having at least one razor-sharp circumferential ridge extending outwardly therefrom gripping the stretched end of the hose, said circumferential ridge being triangular in cross-section with a forward side thereof facing the end of the hose being steeply sloped substantially normal to the longitudinal axis of said coupling and with a rearward side thereof remote from the end of the hose being shallowly sloped, said circumferential ridge having a radial thickness equal to substantially one-third the wall thickness of said hose, cylindrical surfaces joining the inner ends of said forward and rearward sides of said ridge, said cylindrical surfaces having an axial width at least as great as the axial width of said circumferential ridge, means projecting outwardly from said cylindrical surfaces engaging the hose and preventing relative rotation between the hose and tail member, said ferrule being clamped tightly over the end of the hose and having circumferential corrugations extending inwardly indenting the plastic material of the hose and compacting it in intimate contact with the entire outer surface of said tail member and the entire inner surface of said ferrule, said inwardly extending corrugations being radially aligned with said cylindrical surfaces and said projecting means for tightly packing said hose thereagainst, and said tail member having an outwardly projecting circumferential end ridge positioned at the end thereof opposite the connector member and beyond the free end of the ferrule for creating an annular bulge in the hose immediately beyond the end of the ferrule such that a radial bend will be formed in the hose at the end of the coupling when a lateral pull is applied to the hose relative to the coupling and thereby spacing the closest cylindrical surface with its projecting means inwardly from said end of said tail member.

2. A coupling for mechanically locking a hose of synthetic resinous plastic material thereto, wherein said plastic material has inherent cold flow properties and said coupling prevents cold flow of the hose relative thereto when the coupling is completely assembled on the hose, said coupling comprising a connector portion, a hollow tail portion extending from said connector portion and adapted to be inserted into the end of a hose, and a ferrule adapted to encircle the end of the hose and clamp same to said hollow tail portion, said tail portion having an inside diameter substantially equal to the normal inside diameter of the hose whereupon the end of the hose must be stretched to an increased diameter for insertion of the tail portion therein, said hollow tail portion having a plurality of razor-sharp circumferential ridges extending outwardly therefrom gripping the stretched end of the hose, each ridge being substantially triangular in cross-section and having a forward side facing said connector portion and being substantially normal to the longitudinal axis of said coupling and a rearward side facing away from said connector portion and being shallowly sloped, said circumferential ridges having a radial thickness equal to substantially one-third the wall thickness of said hose, cylindrical surfaces joining the inner ends of said forward and rearward sides of each ridge, said cylindrical surfaces having knurling thereon for engaging the plastic hose and preventing relative rotational movement between said hollow tail portion and said hose, said cylindrical surfaces having an axial width at least as great as the axial width of said circumferential ridges, said ferrule being clamped tightly over the end of the hose and in general alignment with said hollow tail portion and having circumferential indentations radially aligned with said knurled cylindrical surfaces thereby forcing the hose thereagainst in intimate contact with the entire outer surface of said tail member and the entire inner surface of said ferrule, said hollow tail portion having an outwardly projecting circumferential end ridge positioned at the end thereof opposite the connector portion and beyond the end of the ferrule for creating an annular bulge in the hose immediately beyond the free end of the ferrule such that a radial bend will be formed in the hose at the end of the coupling when a lateral pull is applied to the hose relative to the coupling and thereby spacing the closest cylindrical knurled surface inwardly from said end of said hollow tail portion, and said end ridge being substantially triangular in cross-section and being formed by two substantially conical surfaces having opposite slopes whereby the hose therearound is stretched in a circumferential ring about the end of the hollow tail portion and beyond the end of the ferrule.

References Cited in the file of this patent

UNITED STATES PATENTS

| | | |
|---|---|---|
| 1,532,886 | Cowles | Apr. 7, 1925 |
| 1,941,467 | Fausek | Jan. 2, 1934 |
| 1,996,855 | Cheswright | Apr. 9, 1935 |
| 2,139,745 | Goodall | Dec. 13, 1938 |
| 2,147,355 | Scholtes | Feb. 14, 1939 |
| 2,181,673 | Tompkins | Nov. 28, 1939 |
| 2,205,347 | Darling | June 18, 1940 |
| 2,211,446 | Troshkin | Aug. 13, 1940 |
| 2,253,691 | Darling | Aug. 26, 1941 |
| 2,430,921 | Edelmann | Nov. 18, 1947 |
| 2,481,001 | Burckle | Sept. 6, 1949 |
| 2,562,116 | Nelson | July 24, 1951 |
| 2,631,047 | Spender | Mar. 10, 1953 |
| 2,735,699 | Chadbourne | Feb. 21, 1956 |
| 2,805,088 | Cline | Sept. 3, 1957 |
| 2,825,588 | Howard | Mar. 4, 1958 |
| 2,902,299 | Turner | Sept. 1, 1958 |

FOREIGN PATENTS

| | | |
|---|---|---|
| 816,069 | France | Apr. 19, 1937 |
| 628,424 | Great Britain | Aug. 29, 1949 |
| 1,003,337 | France | Nov. 14, 1951 |